(12) United States Patent
Condon, II (10) Patent No.: US 11,279,296 B2
(45) Date of Patent: Mar. 22, 2022

(54) CARGO CARRIER SYSTEM

(71) Applicant: Bill Louis Condon, II, Rhodesdale, MD (US)

(72) Inventor: Bill Louis Condon, II, Rhodesdale, MD (US)

(*) Notice: Subject to any disclaimer, the term of this patent is extended or adjusted under 35 U.S.C. 154(b) by 15 days.

(21) Appl. No.: 16/578,636

(22) Filed: Sep. 23, 2019

(65) Prior Publication Data
US 2020/0094747 A1   Mar. 26, 2020

Related U.S. Application Data

(60) Provisional application No. 62/787,605, filed on Jan. 2, 2019, provisional application No. 62/735,161, filed on Sep. 23, 2018.

(51) Int. Cl.
*B60R 9/06* (2006.01)
*B60R 11/00* (2006.01)

(52) U.S. Cl.
CPC ......... *B60R 9/065* (2013.01); *B60R 2011/004* (2013.01); *B60R 2011/008* (2013.01); *B60R 2011/0052* (2013.01); *B60R 2011/0066* (2013.01)

(58) Field of Classification Search
CPC ............... B60R 9/065; B60R 2011/004; B60R 2011/005; B60R 2011/0052; B60R 2011/0064; B60R 2011/0066; B60R 2011/0071; B60R 2011/0078; B60R 2011/008

See application file for complete search history.

(56) References Cited

U.S. PATENT DOCUMENTS

| | | | | |
|---|---|---|---|---|
| 2,812,950 | A * | 11/1957 | Holloway | B62B 3/009 280/42 |
| 5,018,651 | A * | 5/1991 | Hull et al. | B60R 9/06 |
| 5,788,135 | A * | 8/1998 | Janek | B60R 9/06 |
| 5,810,374 | A * | 9/1998 | Small | B62B 1/22 280/292 |
| 6,168,058 | B1 * | 1/2001 | Janek | B60R 9/055 |
| 9,056,623 | B1 * | 6/2015 | Woller et al. | B62B 1/16 |
| 9,663,039 | B2 * | 6/2017 | Marmon et al. | B60R 9/06 |

* cited by examiner

*Primary Examiner* — Corey N Skurdal
(74) *Attorney, Agent, or Firm* — Caldwell Intellectual Property Law; David Bancroft (57) ABSTRACT

Described herein is a cargo carrier system comprising a cargo carrier and a mounting base configured to attach to a vehicle trailer hitch. The cargo carrier can have wheels and can removably attach to the mounting base. The cargo carrier can easily be removed from the mounting base and pivoted to the ground. The mounting base can be pivoted vertically when not in use.

14 Claims, 9 Drawing Sheets

CARGO CARRIER SYSTEM

RELATED APPLICATION

This application claims priority to U.S. Provisional Application No. 62/735,161, filed on Sep. 23, 2018, and U.S. Provisional Application No. 62/787,605, filed on Jan. 2, 2019, which are incorporated by reference herein in their entirety.

BACKGROUND OF THE INVENTION

Field of the Invention

Embodiments of the present disclosure relate to a cargo carrier system, more specifically, to a cargo carrier system that carries cargo to and from the towing vehicle and attaches to a trailer hitch.

Description of the Related Art

Trailers attach to trailer hitches at the back of towing vehicles and carry items behind the vehicle for transporting. Trailers necessarily hold the items a height above the ground and the items are generally heavy and difficult to load and unload onto a trailer. It can also be difficult to carry heavy items to and from a trailer.

SUMMARY

Described herein are embodiments of a cargo carrier system. The cargo carrier system comprises a cargo carrier and a mounting base. The cargo carrier can comprise a frame to support cargo and one or more wheels on a first end of the frame for easy mobility. The cargo carrier can be loaded with cargo in a location remote from a vehicle or trailable unit and rolled to the vehicle or its trailable unit. Trailable units can include trailers with their own trailer hitches. The mounting base can be attachable to the vehicle or trailable unit's trailer hitch, specifically a trailer hitch receiver tube or a receiver tube adapter. The cargo carrier can be easily aligned and attached to the mounting base and securely towed by the vehicle to the intended destination.

Once the cargo has reached its destination, the cargo carrier can be released from the mounting base with the press of a button and pivoted off the mounting base and rolled away. When the mounting base is not in use, it can be pivoted upward so that it is in a vertical orientation and proximate to the back of the vehicle.

BRIEF DESCRIPTION OF THE DRAWINGS

FIG. 17a is a perspective view of a mounting base according to an embodiment of the present disclosure.

FIG. 17b is a perspective view of the mounting base according to an embodiment of the present disclosure shown in FIG. 17a.

DETAILED DESCRIPTION OF THE INVENTION

Described herein are embodiments of a cargo carrier system. The cargo carrier system comprises a cargo carrier and a mounting base. The cargo carrier can comprise a frame to support cargo and one or more wheels on a first end of the frame for easy mobility. The cargo carrier can be loaded with cargo in a location remote from a vehicle or trailable unit and rolled to the vehicle or its trailable unit. The mounting base can be attachable to the vehicle or trailable unit's trailer hitch, specifically a trailer hitch receiver tube or a receiver tube adapter. The cargo carrier can be easily aligned and attached to the mounting base and securely towed by the vehicle to the intended destination.

Once the cargo has reached its destination, the cargo carrier can be released from the mounting base with the press of a button and pivoted off the mounting base and rolled away. When the mounting base is not in use, it can be pivoted upward so that it is in a vertical orientation and proximate to the back of the vehicle.

Throughout this description, the preferred embodiment and examples illustrated should be considered as exemplars, rather than as limitations on the present invention. As used herein, the term "disclosure," "device," "present disclosure," or "present device" refers to any one of the embodiments of the invention described herein, and any equivalents. Furthermore, reference to various feature(s) of the "disclosure," "device," "present disclosure," or "present device" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical," "top" "bottom," "side" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

Embodiments of the disclosure are described herein with reference to illustrations that are schematic. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the invention.

It is understood that when a first element is referred to as being "between" two or more other elements, the first element can be directly between the two or more other elements or intervening elements may also be present between the two or more other elements. For example, if a first element is "between" a second and third element, the first element can be directly between the second and third elements with no intervening elements or the first element can be adjacent to one or more additional elements with the first element and these additional elements all between the second and third elements.

Figure 1:
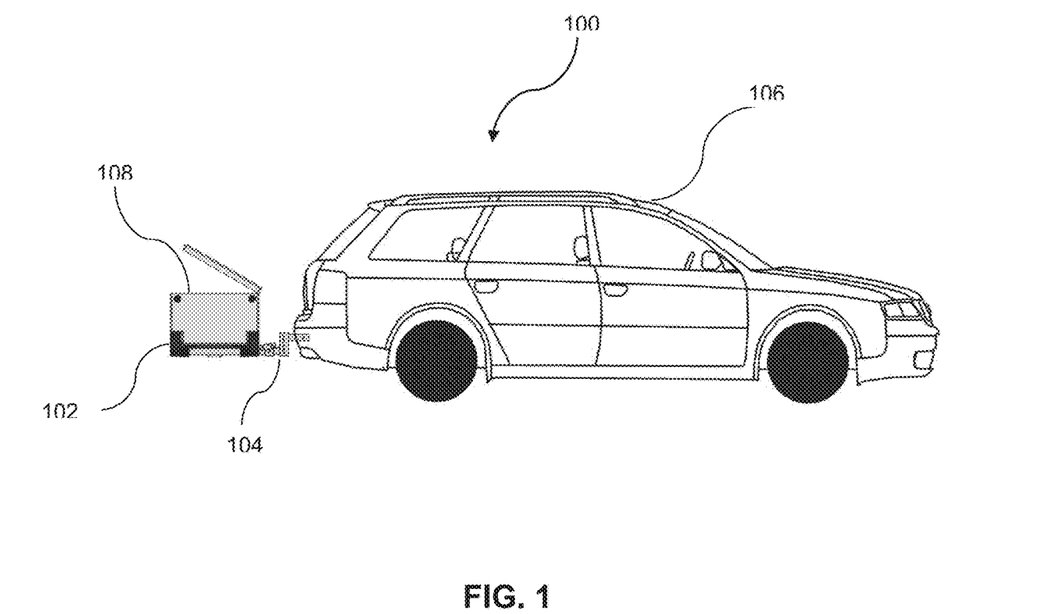
FIG. 1 is a side view of a cargo carrier system according to an embodiment of the present disclosure in its environment.

FIG. 1 shows a side view of a cargo carrier system 100 according to an embodiment of the present disclosure in its environment. The cargo carrier system 100 can comprise a cargo carrier 102 and a mounting base 104. The mounting base 104 is attached to a vehicle 106, and the cargo carrier 102 is on the mounting base 104. The cargo carrier 102 can have an optional compartment 108, as shown here, to store items for transport.

The cargo carrier 102 and the mounting base 104 can be made of various materials including, but not limited to, plastic, composite materials, wood, metals such as stainless steel or aluminum alloy, and any other material known within the field to provide sufficient strength to hold luggage.

Figure 2:
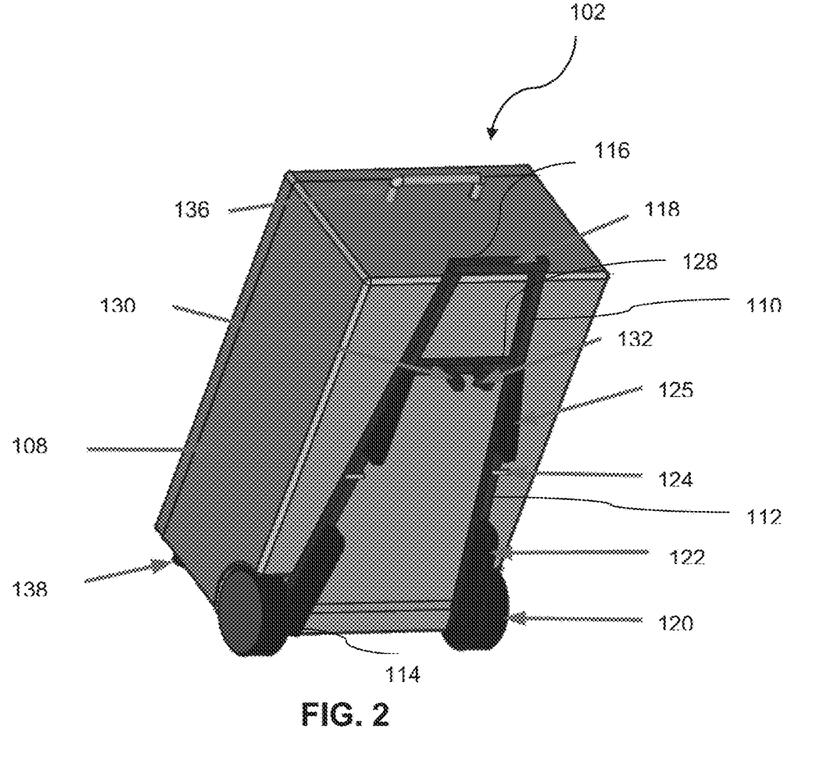
FIG. 2 is a perspective bottom view of a cargo carrier according to an embodiment of the present disclosure shown in FIG. 1.

FIG. 2 shows a perspective bottom view of the cargo carrier 102. The cargo carrier 102 can comprise a frame 110 to support cargo it carries. FIG. 2 shows the frame 110 comprising two support bars 112 extending from a first end 114 to a second end 116 of the frame, wherein a handle 118 at the second end connects the two support bars. In some embodiments, there can be a single wide support bar 112 or platform with a handle 118 at the second end 116. In some embodiments, the frame 110 can have three or more support bars 112, wherein at least one support bar is connected to a handle 118.

FIG. 2 shows two wheels 120 on a first end 114 of a frame 110 to roll the cargo carrier 102. In some embodiments, the frame 110 can have one wheel, three wheels, or more than three wheels on the first end 114. In some embodiments, the wheels can be removably attached to the cargo carrier 102 by various instruments such as pins or clips and replaced with various styles and sizes of wheels. Support bars 112 can run along the interior of the wheels 120 and can have skids 122 protruding from the support bars to allow the cargo carrier 102 to easily slide over stairs and prevent the wheels from catching the steps. On the bottom side of both support bars 112 between the skids 122 and a second end 116 of the frame 110 can be a pivot pin 124 that partially extends past the lateral side of the support bar. Between the pivot pins 124 and the second end 116 can be pivot wedges 125 protruding from the bottom of the support bars 112. The pivot wedges 125 can be triangular with a side perpendicular or substantially perpendicular to the support bars 112 and adjacent to a side gradually sloping toward the second end 116. A crossbar 128 can connect the support bars 112 between the sloping end of the pivot wedges 125 and the second end 116. In some embodiments, a crossbar 128 can be between the pivot wedges 125. A foot 130, which is an attachment mechanism, can extend substantially perpendicular from the bottom surface of the cross bar 128 and can comprise latch catches 132. The foot 130 can act as a leg when the cargo carrier 102 is horizontal on the ground. In some embodiments, the foot 130 and wheels 120 can be positioned so the cargo carrier 102 can be level when horizontal on the ground.

The embodiment shown in FIG. 2 has a compartment 108 on the frame 110. In some embodiments, the compartment 108 can have recesses to contour to the shape of the wheels 120. In some embodiments, the compartment 108 can be weather resistant. In some embodiments, the compartment 108 can be permanently attached to the frame 110 by, for example, adhesive, screws, nails, rivets, solder, or any other attachment components known within the field. In other embodiments, the compartment 108 can be removably attached to the frame 110. In some embodiments, the compartment 108 can be locked to the frame 110 for security. In some embodiments, the compartment 108 can be interchanged with various sizes and styles of compartments. In some embodiments, the compartment 108 can have a lockable opening such as a lid. In some embodiments, the compartment 108 comprises one or more handles 136. In some embodiments, the compartment 108 can have one or more feet 138 on a side opposite a side with a handle 136.

Figure 3:
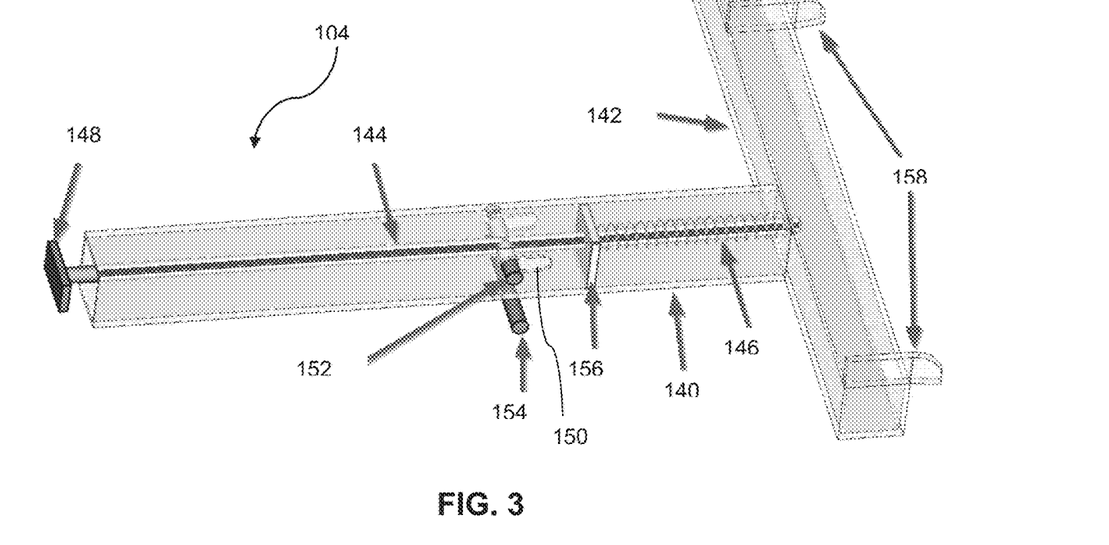
FIG. 3 is a partial side perspective view and the internal structure of a mounting base according to an embodiment of the present disclosure shown in FIG. 1.

FIG. 3 shows a partial side perspective view and the internal structure of the mounting base 104. The mounting base 104 comprises a lateral arm 140, wherein an end of said lateral arm 140 can be coupled to a perpendicular main arm 142 such that a portion of the main arm extends on either side of the lateral arm. A release rod 144 can run along a portion of the length of the lateral arm 140 inside the lateral arm and at least partially protrude out the distal end of the lateral arm 140. In some embodiments the release rod 144 runs the entire length of the lateral arm 140. The proximal end of the release rod 144 can be inside a spring 146, and the distal end of the release rod can have a release button 148. Elongated openings 150 can be on facing walls of the lateral arm 140, and the release rod 144 can have a latch catch pin 152, which is a coupling mechanism, extending through both elongated openings.

The spring 146 can press between the release rod 144 or an object on the release rod and another object, causing the release rod 144 to bias in an extended position such that the release button 148 and a portion of the release rod adjacent to the release button is extended from the lateral arm 140, and the latch catch pin 152 is contacting the ends of the elongated openings 150 towards the release button 148. In some embodiments, the lateral arm 140 can have a securing pin 154 on the bottom surface extending from either longitudinal side and positioned below the latch catch pin 152 when the release rod 144 is in its extended position. In some embodiments, the securing pin 154 can be on the side surfaces of the lateral arm 140.

In some embodiments, an end of the spring 146 contacts the latch catch pin 152. In some embodiments, an end of the spring 146 contacts a spring base 156 that is coupled to the release rod 144. In some embodiments, the opposite end of the spring 146 is on the main arm 142. In some embodiments, the main arm 142 has a hole for the release rod 144 through which to extend. Two guides 158 can be on a top surface of the main arm 142, one on either side of the lateral arm 140, and can help center and guide the cargo carrier 102 onto the mounting base 104. The guides 158 can extend over the side opposite the lateral arm 140.

Figure 4:
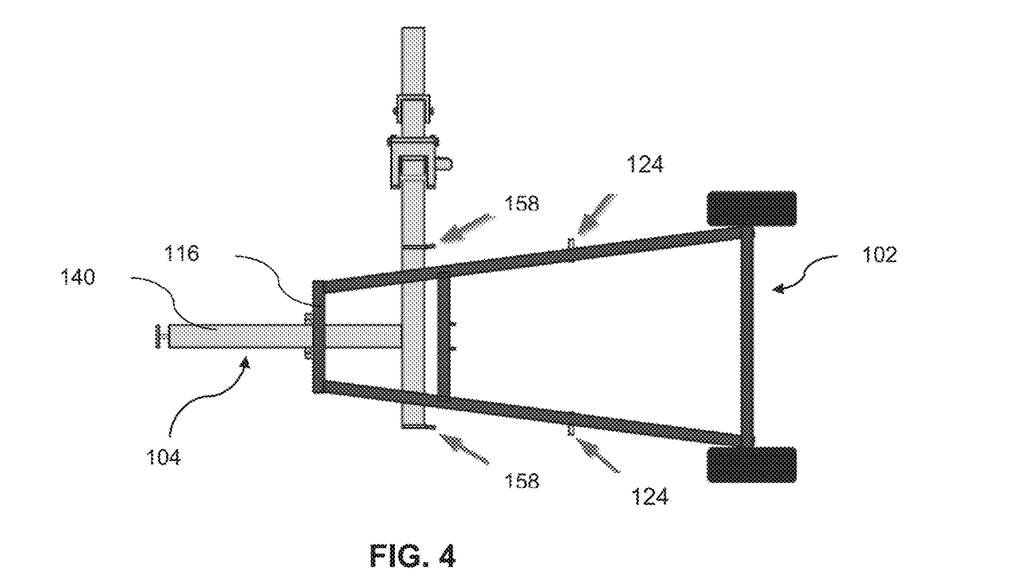
FIG. 4 is a top view of the cargo carrier system according to an embodiment of the present disclosure shown in FIG. 1.
Figure 5:
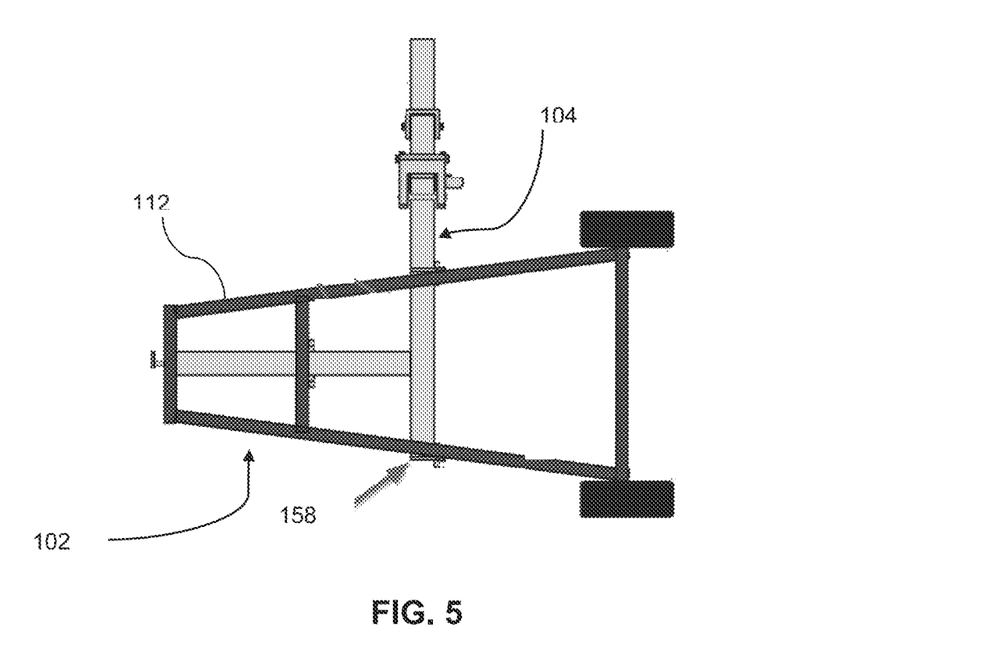
FIG. 5 is a top view of the cargo carrier system according to an embodiment of the present disclosure shown in FIG. 1.

FIGS. 4 and 5 show a top view of the cargo carrier 102 and the mounting base 104. In FIG. 4, the second end 116 of the cargo carrier 102 is over the lateral arm 140 and approaching the position for the cargo carrier to removably attach to the mounting base 104. FIG. 5 shows the cargo carrier 102 positioned on and removably attached to the mounting base 104. The support bars 112 of the cargo carrier adjacent to and/or contacting the guides 158 on the mounting base 104 serve to stabilize the cargo carrier.

Figure 6:
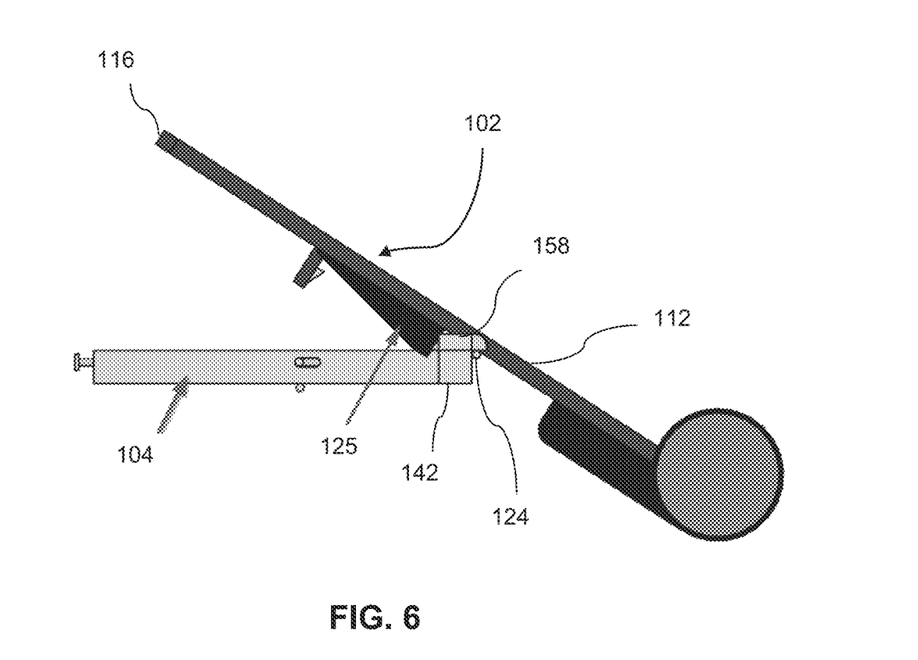
FIG. 6 is a side view of the cargo carrier system according to an embodiment of the present disclosure shown in FIG. 1.

FIG. 6 shows a side view of the cargo carrier 102 partially on the mounting base 104. Once the cargo carrier 102 is rolled to the mounting base 104, it is leaned back against the mounting base such that the support bars 112 are between the guides 158 and the main arm 142 is nestled against the substantially perpendicular side of the pivot wedges 125 and the support bars 112. The pivot wedges 125 prevent the cargo carrier 102 from sliding away from the mounting base 104 as the cargo carrier is being positioned onto the mounting base. The pivot pins 124 on the support bars 112 fit between the main arm 142 and a portion of the guides 158 that extends past the main arm. The second end 116 of the cargo carrier 102 is then pushed down against the mounting base 104, using the main arm 142 as a fulcrum, resulting in the main arm being positioned between the pivot wedges 125 and the pivot pins 124.

Figure 7:
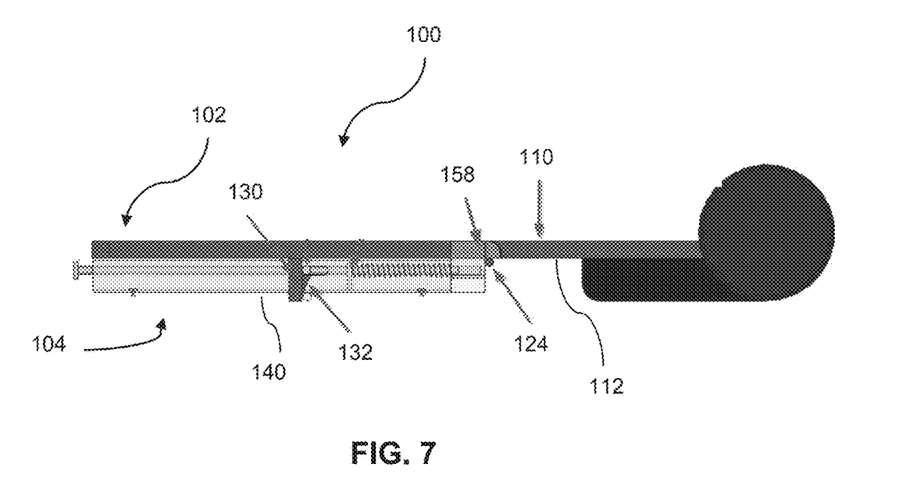
FIG. 7 is a partially transparent side view of the cargo carrier system according to an embodiment of the present disclosure shown in FIG. 1.

FIG. 7 shows a side view of the cargo carrier system 100 with the cargo carrier 102 removably attached to the mounting base 104, showing the internal structure of the mounting base. When the cargo carrier 102 is pushed down against the mounting base 104, the foot 130 on the cargo carrier removably attaches to the lateral arm 140. The foot 130 can comprise an opening substantially the same width as the width of the lateral arm 140 to securely receive the lateral arm. On either side of the opening can be a latch catch 132 that is a triangular protrusion extending parallel to the support bars 112 such that a side nearer the support bars is substantially perpendicular to the foot 130 and is adjacent to a side gradually sloping toward the distal end of the foot 130. The pivot pins 124, positioned below the extended portion of the guides 158 prevents the cargo carrier 102 from pivoting off or sliding on the mounting base 104.

Figure 8:
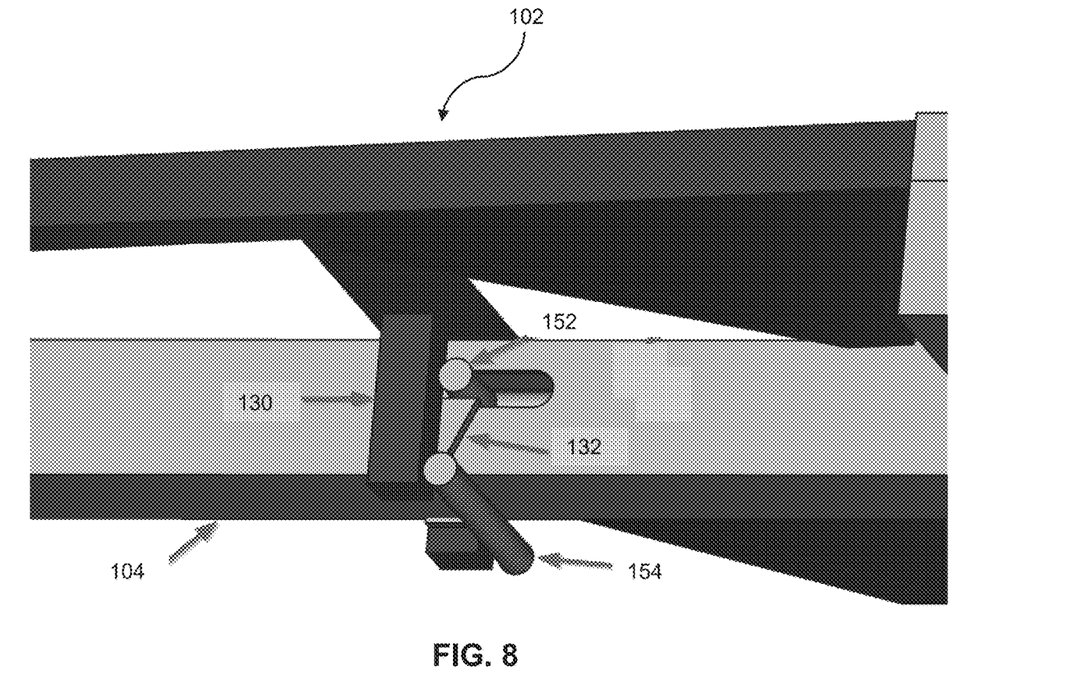
FIG. 8 is a magnified partial side view of the cargo carrier system according to an embodiment of the present disclosure shown in FIG. 1.

FIG. 8 shows a magnified partial view of the cargo carrier 102 removably attached to the mounting base 104. As the cargo carrier 102 is positioned against the mounting base 104, the gradually sloping sides of the latch catches 132 move past the latch catch pin 152 that is biased by the spring 146 (as shown in FIG. 3), and displace the latch catch pin. Once the latch catches 132 are past the latch catch pin 152, the latch catch pin returns to its biased position and prevents the latch catches, and thus the cargo carrier 102, from dislodging from the mounting base 104. The mounting base 104 can further have a securing pin 154 parallel to and below the latch catch pin 152 that prevents the foot 130, and thus the cargo carrier 102, from sliding or pivoting.

Figure 9:
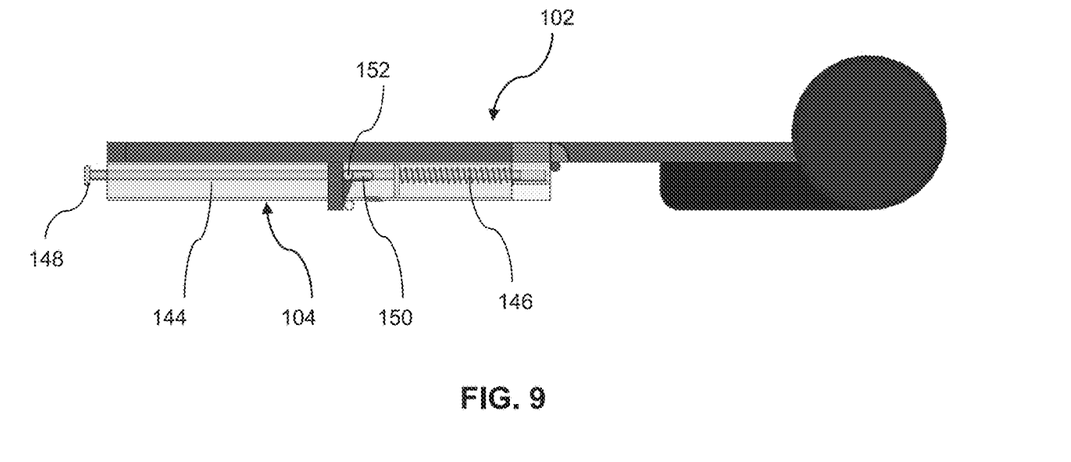
FIG. 9 is a partially transparent side view of the cargo carrier system according to an embodiment of the present disclosure shown in FIG. 1.
Figure 10:
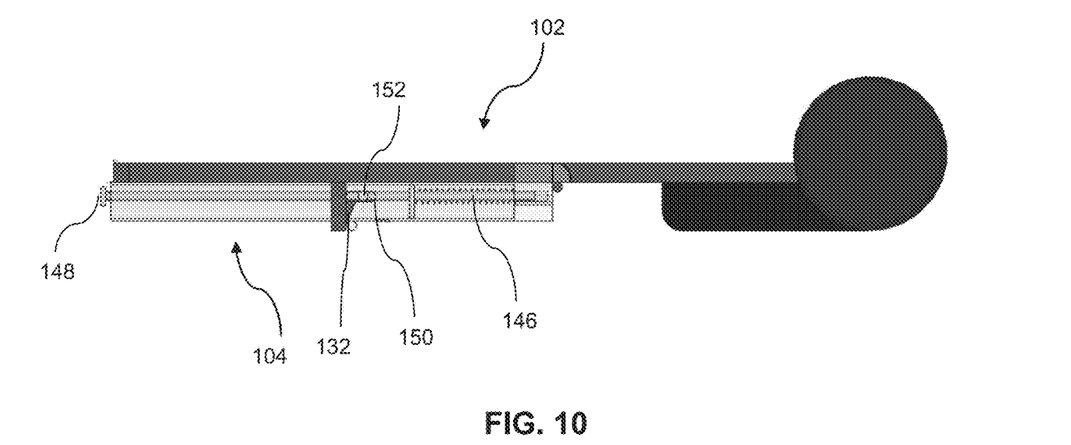
FIG. 10 is a partially transparent side view of the cargo carrier system according to an embodiment of the present disclosure shown in FIG. 1.

FIGS. 9 and 10 show side views of the cargo carrier 102 removably attached to the mounting base 104, showing internal components of the mounting base. In FIG. 9, the latch catch pin 152 is biased against the elongated opening 150 by the force of the spring 146. The release bar 144 is similarly biased by the spring 146 and the release button 148 is extended from the mounting base 104. FIG. 10 shows the release button 148 pressed, which displaces the release bar 144 and the latch catch pin 152, allowing the latch catches 132 and entire cargo carrier 102 to be removed from the mounting base 104. Once the towing vehicle has reached its destination, the cargo carrier 102 can easily be removed from the mounting base 104 by pressing the release button 148 and rotating the cargo carrier 102 to the ground. In some embodiments, the mounting base 104 can have a lever instead of a release button to release the cargo carrier 102 from the mounting base 104.

The cargo carrier 102 and the mounting base 104 can removably attach in various ways. In some embodiments, at least a portion of an attachment mechanism on the cargo carrier 102 can communicate with a spring to engage and disengage with a coupling mechanism on the mounting base 104. In some embodiments, an attachment mechanism on the cargo carrier 102 can insert into a coupling mechanism on the mounting base 104. In some embodiments, a coupling mechanism on the mounting base 104 can insert into an attachment mechanism on the cargo carrier 102.

Figure 11A:
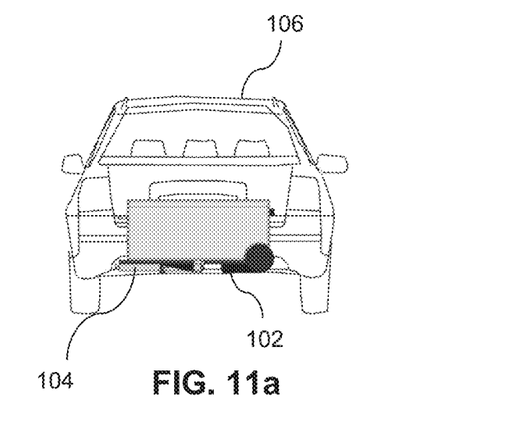
FIG. 11a is an environmental view of the cargo carrier system according to an embodiment of the present disclosure shown in FIG. 1.
Figure 11B:
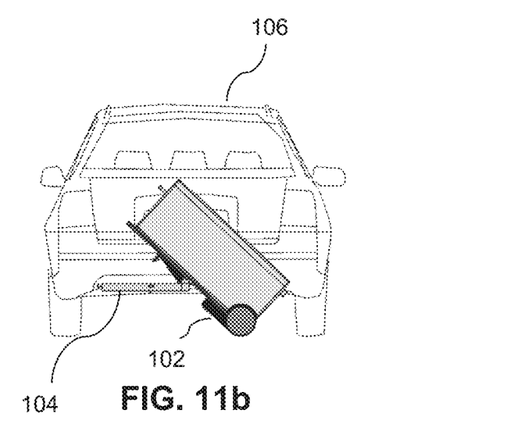
FIG. 11b is an environmental view of the cargo carrier system according to an embodiment of the present disclosure shown in FIG. 1.
Figure 12A:
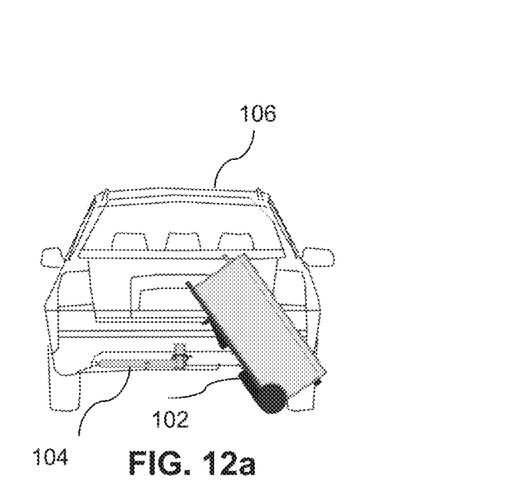
FIG. 12a is an environmental view of the cargo carrier system according to an embodiment of the present disclosure shown in FIG. 1.
Figure 12B:
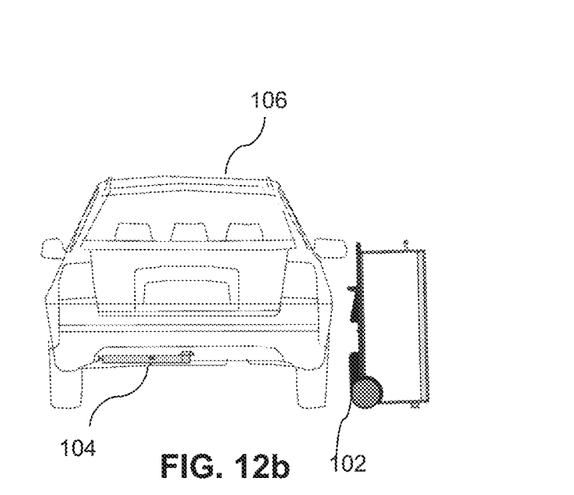
FIG. 12b is an environmental view of the cargo carrier system according to an embodiment of the present disclosure shown in FIG. 1.

FIGS. 11a through 12b show environmental views of the cargo carrier 102 being removed from the mounting base 104 that is attached to a towing vehicle 106. In FIG. 11a, the cargo carrier 102 is removably attached to the mounting base 104. FIG. 11b shows the cargo carrier 102 pivoted off the mounting base 104. FIGS. 12a and 12b show the cargo carrier 102 completely off the mounting base 104 and on the ground.

Figure 13:
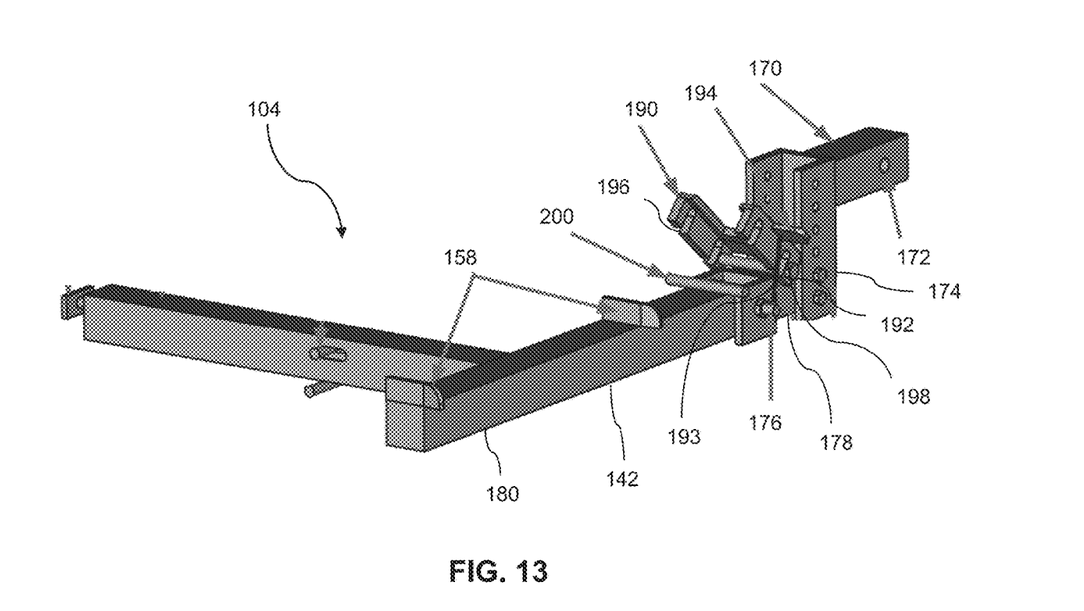
FIG. 13 is a perspective view of the mounting base according to an embodiment of the present disclosure shown in FIG. 1.
Figure 14:
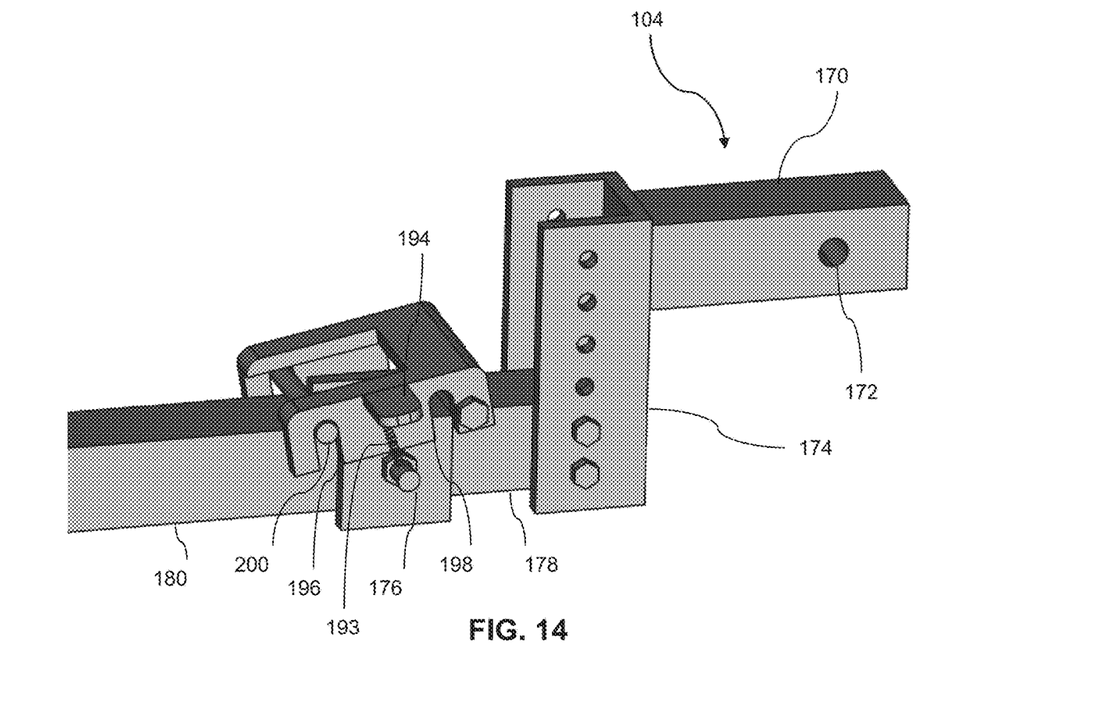
FIG. 14 is a magnified partial perspective view of the mounting base according to an embodiment of the present disclosure shown in FIG. 1.

FIGS. 13 and 14 show a perspective view and a magnified partial perspective view of the mounting base 104, respectively. The mounting base 104 can removably attach to a trailer hitch of a towing vehicle, specifically a trailer hitch receiver tube or a receiver tube adapter, via a shank 170. An end of the shank 170 fits on the trailer hitch and can have a bore 172 through which a bolt can fit and pass through the trailer hitch receiver or receiver adapter. The other end of the shank 170 is coupled to a drop bar 174 that can be removably attached to the main arm 142 via one or more connectors. In some embodiments, the connectors can be bores and bolts wherein the drop bar and the main arm have one or more aligning bores through which a bolt can secure them together. In some embodiments, there are bores along the length of the drop bar 174 so the height of the main arm 142 can be adjusted in relation to a towing vehicle.

The main arm 142 can be comprised of two arms that connect to each other by a storage pivot pin 176. One arm, which is the short arm 178, is connected to the drop bar 174. The other arm, which is the long arm 180, makes up most of the length of the main arm 142. As shown in FIG. 13, the guides 158 are on the longer arm of the main arm 142. In some embodiments, the short arm 178 can wrap around the sides and bottom of the long arm 180 while leaving the top of the long arm uncovered. In these embodiments, the storage pivot pin 176 fits through holes in the sides of the short arm 178 wrapping around the long arm 180 and through the long arm. In some embodiments, the short arm 178 is connected to plates over a portion of the sides and bottom of the long arm 180 while leaving the top of the long arm uncovered. In these embodiments, the storage pivot pin 176 fits through holes in the plates on the sides of the long arm 180 and the long arm. In some embodiments, only one side of the long arm 180 is covered.

While the mounting base 104 is attached to a vehicle, the main arm 142 can be pivoted vertically along the storage pivot pin 176 when not in use. A locking jaw 190 can be attached to the short arm 178. In some embodiments, the short arm 178 can have a short arm pin 192 that is passed through holes in the locking jaw 190. The short arm pin 192 allows the locking jaw 190 to remain attached to the mounting base 104 while being able to pivot. The locking jaw 190 can be biased to remain against the main arm 142 by a storage spring 193 connected to the locking jaw 190 and the main arm. In some embodiments, the storage spring 193 is connected to a release tab 194 on the locking jaw 190. In some embodiments, the storage spring 193 is connected to the storage pivot pin 176 on the main arm 142. The release tab 194 is a tab extending from the locking jaw 190 that allows a user to lift the locking jaw 190 against the force of the storage spring 193.

The locking jaw 190 can have two use cavities 196 opposite each other and two storage cavities 198 opposite each other, all facing downward toward and substantially parallel to the storage spring 193. The long arm 180 can have a storage latch pin 200 perpendicular to and extending past the width on either side of the long arm. The storage latch pin 200 can fit into the use cavities 196 and secure the mounting base 104 into a horizontal position for use, as shown in FIG. 14. While the storage latch pin 200 is in the use cavities 196, the main arm 142 cannot pivot along the storage pivot pin 176.

Figure 15:
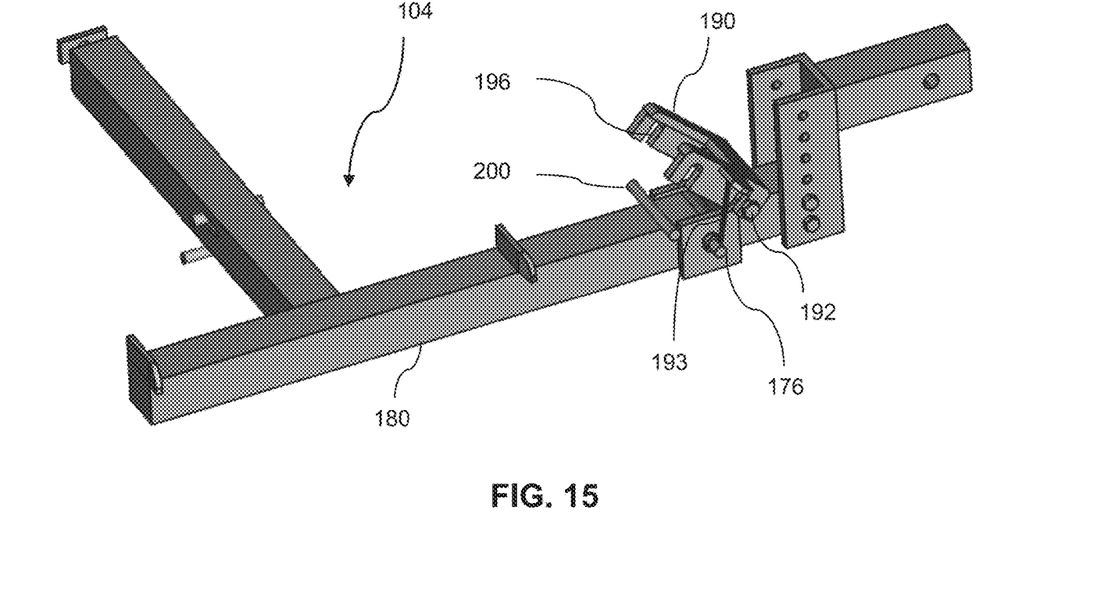
FIG. 15 is a perspective view of the mounting base according to an embodiment of the present disclosure shown in FIG. 1.
Figure 16:
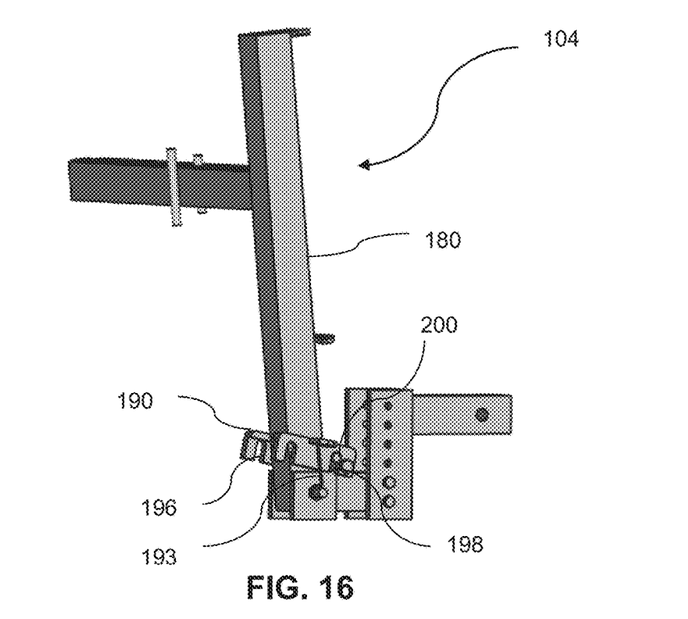
FIG. 16 is a perspective view of the mounting base according to an embodiment of the present disclosure shown in FIG. 1.

FIGS. 15 and 16 show perspective views of the mounting base 104. In FIG. 15, the locking jaw 190 has been lifted against the force of the storage spring 193 and pivoted around the short arm pin 192 such that the storage latch pin 200 is no longer in the use cavities 196. This allows the long arm 180 to pivot around the storage pivot pin 200 and frees the mounting base 104 to move to a vertical position.

In FIG. 16, the mounting base 104 is in the vertical position and the locking jaw 190 is repositioned so the storage latch pin 200 is now in the storage cavities 198. The storage cavities 198 thus restrict the movement of the long arm 180 and secure the mounting base 104 in the vertical position. The force applied to the locking jaw 190 from the storage spring 193 prevents the locking jaw from being unintentionally dislodged. In some embodiments, there are multiple storage springs 193 such as one on either side of the locking jaw 190.

Figures 17A, 17B:
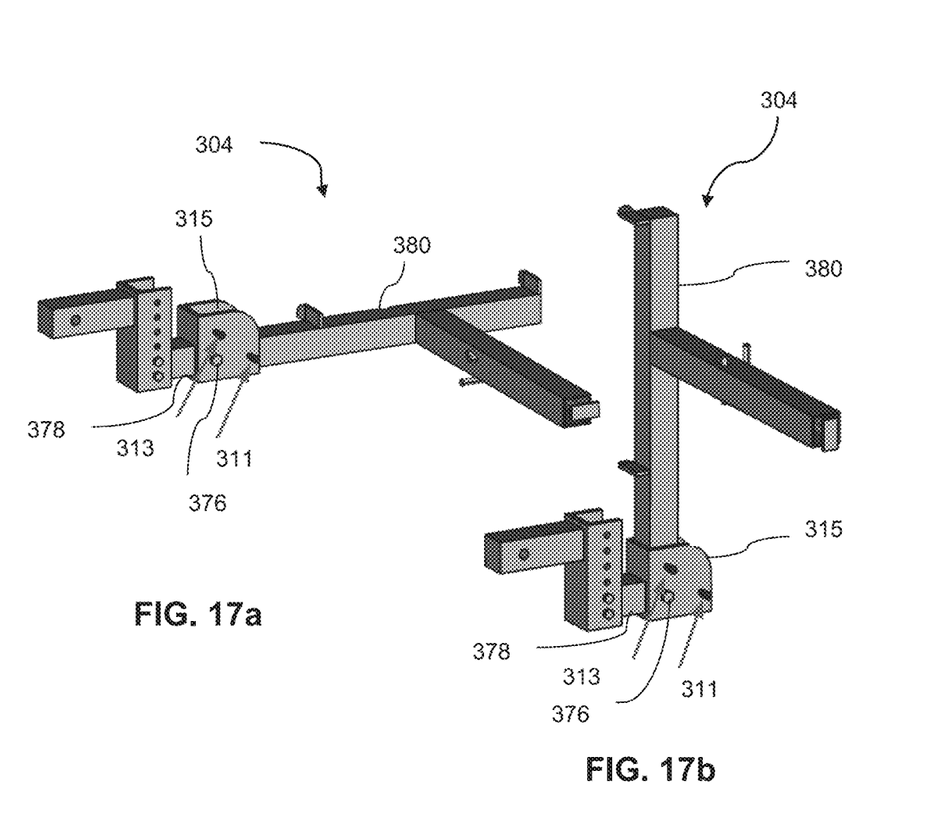

FIGS. 17a and 17b show perspective views of another embodiment of a mounting base 304. The mounting base 304 is similar to the mounting base 104 except that it does not have a locking jaw 190. Instead, the mounting base 304 is secured in its horizontal position or vertical position and prevented from pivoting on a storage pivot pin 376 by locking pins 311, 313. The locking pins 311, 313 can removably fit through corresponding holes in a first plate of a connector 315, the long arm 380, and a second plate of the connector 315 located on the opposite side of the long arm. Similarly, the storage pivot pin 376 can fit through holes in the first plate of a connector 315, the long arm 380, and the second plate of the connector 315. The connector 315 can be connected directly or indirectly to the short arm 378. FIG. 17a shows the mounting base 304 secured in its horizontal position by the locking pin 311. FIG. 17b shows the mounting base 304 secured in its vertical position by the locking pin 313. In some embodiments, there is only one locking pin that can be placed through either set of holes in which locking pins 311, 313 are. In some embodiments, there is only one plate through which the locking pins 311, 313 to fit.

Although the present disclosure has been described in detail with reference to certain preferred configurations thereof, other versions are possible. Embodiments of the present disclosure can comprise any combination of compatible features shown in the various figures, and these embodiments should not be limited to those expressly illustrated and discussed. Therefore, the spirit and scope of the disclosure should not be limited to the versions described above.

I claim:

1. A cargo carrier, comprising:
    a frame comprising a first end and a second end opposite said first end, said frame comprising two support bars;
    one or more wheels on said first end of said frame;
    an attachment mechanism on a first side of said frame; and
    a protrusion on each of said two support bars, each said protrusion at least partially extending away from said frame and substantially parallel to said first end;
    wherein said attachment mechanism is removably attachable to a mounting base that is configured to attach to a vehicle trailer hitch, wherein said two support bars converge at least from said protrusions toward said second end.

2. The cargo carrier according to claim 1, wherein said attachment mechanism is substantially equidistant from said two support bars.

3. The cargo carrier according to claim 1, further comprising one or more wedges extending from said first side of said frame.

4. The cargo carrier according to claim 3, further comprising one or more protrusions on said first side of said frame between said one or more wheels and said one or more wedges, wherein said one or more protrusions at least partially extends past said first side of said frame.

5. The cargo carrier according to claim 4, wherein said one or more protrusions are positioned for said frame to receive a portion of said mounting base between said one or more protrusions and said one or more wedges.

6. The cargo carrier according to claim 1, wherein said attachment mechanism comprises a foot extending substantially perpendicular from said first side of said frame, wherein said foot comprises one or more latch catches.

7. A mounting base configured to attach to a vehicle trailer hitch, comprising:
   a main arm;
   a lateral arm comprising first and second ends, said first end of said lateral arm coupled to said main arm such that a portion of said main arm extends past either side of said lateral arm, said lateral arm comprising a coupling mechanism configured to removably attach to a cargo carrier; and
   a button communicatively coupled to said coupling mechanism, wherein pressing said button detaches said cargo carrier from said mounting base.

8. The mounting base according to claim 7, wherein said button extends from a distal end of said lateral arm.

9. A cargo carrier, comprising:
   a frame comprising two wheels on a first end of said frame;
   an attachment mechanism on a first side of said frame; and
   one or more wedges extending from said first side of said frame;
   wherein said attachment mechanism is removably attachable to a mounting base that is configured to attach to a vehicle trailer hitch; wherein said attachment mechanism is substantially equidistant from said two wheels.

10. The cargo carrier according to claim 9, further comprising one or more protrusions on said first side of said frame between said one or more wheels and said one or more wedges, wherein said one or more protrusions extends away from said frame and substantially parallel to said first end.

11. The cargo carrier according to claim 10, wherein said one or more protrusions are positioned for said frame to receive a portion of said mounting base between said one or more protrusions and said one or more wedges.

12. The cargo carrier according to claim 9, wherein said one or more wedges are between said attachment mechanism and said first end of said frame.

13. A mounting base configured to attach to a vehicle trailer hitch, comprising:
   a main arm; and
   a lateral arm comprising first and second ends, said first end of said lateral arm coupled to said main arm such that a portion of said main arm extends past either side of said lateral arm, said lateral arm comprising a coupling mechanism configured to removably attach to a cargo carrier;
   wherein said lateral arm comprises one or more opening, where said coupling mechanism comprises a latch catch pin extending through said one or more openings.

14. A cargo carrier, comprising:
   a frame comprising two wheels on a first end of said frame; and
   an attachment mechanism on a first side of said frame;
   wherein said attachment mechanism is removably attachable to a mounting base that is configured to attach to a vehicle trailer hitch; wherein said attachment mechanism is substantially equidistant from said two wheels; wherein said attachment mechanism comprises a foot extending substantially perpendicular from said first side of said frame, wherein said foot comprises one or more latch catches.

* * * * *